US006714246B1

United States Patent
Sawachi

(10) Patent No.: US 6,714,246 B1
(45) Date of Patent: Mar. 30, 2004

(54) PORTABLE IMAGE PICK-UP APPARATUS AND METHOD OF CONTROLLING OPERATION THEREOF

(75) Inventor: Youichi Sawachi, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/573,343

(22) Filed: May 19, 2000

(30) Foreign Application Priority Data

May 21, 1999 (JP) .......................... 11-141181

(51) Int. Cl.[7] .............................. H04N 5/232
(52) U.S. Cl. ....................... 348/345; 396/137
(58) Field of Search ............... 348/345, 229.1, 348/333.12, 349, 255, 227.1; 396/137, 99, 108

(56) References Cited

U.S. PATENT DOCUMENTS

| | | | | |
|---|---|---|---|---|
| 4,775,892 A | * | 10/1988 | Surdyke ................ 348/345 |
| 5,369,436 A | * | 11/1994 | Kawakami et al. ...... 348/355 |
| 5,496,106 A | * | 3/1996 | Anderson ............... 348/255 |
| 5,652,930 A | * | 7/1997 | Teremy et al. .......... 396/287 |
| 5,774,750 A | * | 6/1998 | Honda .................. 396/159 |
| 6,118,485 A | * | 9/2000 | Hinoue et al. .......... 348/373 |
| 6,411,306 B1 | * | 6/2002 | Miller et al. ........... 345/690 |
| 6,529,212 B2 | * | 3/2003 | Miller et al. ........... 345/690 |
| 6,590,612 B1 | * | 7/2003 | Rosenqvist et al. ...... 348/349 |
| 2002/0075395 A1 | * | 6/2002 | Ohkawara .............. 348/347 |
| 2002/0171751 A1 | * | 11/2002 | Ohkawara .............. 348/347 |

* cited by examiner

Primary Examiner—Vu Le
Assistant Examiner—Nelson D. Hernandez
(74) Attorney, Agent, or Firm—Birch, Stewart, Kolasch & Birch, LLP

(57) ABSTRACT

If a digital still camera is set for a manual focus adjustment and the luminance of a subject has a value less than a predetermined threshold value, the amplification factor of an amplifier circuit is set to a display amplification factor higher than that of the ordinary amplification factor. A video signal that has been amplified at this high amplification factor is applied to a liquid crystal display unit of the camera. A bright image of the subject is thus displayed on the display unit. Since the image of the subject is made easier to see owing to the increased brightness thereof, manual focusing is easy even when photography is performed at dark location.

7 Claims, 3 Drawing Sheets

PORTABLE IMAGE PICK-UP APPARATUS AND METHOD OF CONTROLLING OPERATION THEREOF

BACKGROUND OF THE INVENTION

1. Field of the Invention

This invention relates to a portable image pick-up apparatus having an image sensing device for sensing the image of a subject and outputting a video signal representing the image of the subject, and a signal amplifier circuit for amplifying the video signal output from the image sensing device, as well as to a method of controlling the operation of this apparatus.

2. Description of the Related Art

A portable image pick-up apparatus such as a digital still camera often is provided with a display unit on the display screen of which the image of a subject is displayed. The user decides the angle of view while observing the image of the subject being displayed on the display screen of the display unit.

Depending upon the type of digital still camera, the user may perform focusing manually. That is, the user focuses the camera manually while observing the image of the subject being displayed on the display screen of the display unit.

When the image of a subject is picked up by photography at a dark location, however, the video signal obtained has a low level. As a consequence, the image of the subject being displayed on the display screen of the display unit becomes too dark, making it difficult to perform focusing manually.

In order to facilitate manual focusing, digital cameras which increase the amount of contour emphasis or open the aperture have been made available. Nevertheless, photography at dark locations still involves difficult manual focusing.

DISCLOSURE OF THE INVENTION

An object of the present invention is to make manual focusing comparatively easy even when photography is performed at dark locations.

According to the present invention, the foregoing object is attained by providing a portable image pick-up apparatus comprising: an image sensing device for sensing the image of a subject and outputting a video signal representing the image of the subject; a focusing setting unit for setting autofocus and manual focus selectively; a signal amplifier circuit for amplifying the video signal output from the image sensing device; an amplification-factor changeover unit (amplification changeover means), responsive to setting of manual focus by the focusing setting unit, for changing over an amplification factor of the signal amplifier circuit from a predetermined initial amplification factor to a first display amplification factor that is greater than the initial amplification factor; a display unit for displaying the image of the subject represented by the video signal amplified by the signal amplifier circuit; a trigger signal generating circuit for generating a trigger signal in response to a record command (e.g., pressing of a shutter-release button) applied thereto; and a recording control unit (recording control means), responsive to the trigger signal generated by the trigger signal generating circuit, for recording the video signal, which is output from the image sensing device, on a recording medium.

The present invention provides also an operation control method suited to the portable image pick-up apparatus described above. Specifically, the present invention provides a method of controlling operation of a portable image pick-up apparatus having an image sensing device for sensing the image of a subject and outputting a video signal representing the image of the subject, and a signal amplifier circuit for amplifying the video signal output from the image sensing device, the method comprising the steps of: providing a focusing setting unit for setting autofocus and manual focus selectively; changing over an amplification factor of the signal amplifier circuit from a predetermined initial amplification factor to a first display amplification factor that is greater than the initial amplification factor in response to setting of manual focus by the focusing setting unit; displaying the image of the subject represented by the video signal amplified by the signal amplifier circuit; and recording the video signal, which is output from the image sensing device, on a recording medium in response to pressing of a shutter-release button.

The present invention is such that when manual focus is set, the amplification factor is changed over from the initial amplification factor to a first display amplification factor higher than the initial amplification factor. The video signal obtained by sensing the image of a subject is amplified by the signal amplifier circuit in accordance with the first display amplification factor. The amplified video signal is then applied to the display unit, whereby the image of the subject is displayed. Since the video signal has been raised to a higher level, the image of the subject displayed on the display unit is brightened.

Thus, a bright subject image is displayed on the display unit even if the subject is photographed at a dark location. Because the image of the subject is easier to see, manual focusing is easier to carry out.

The video signal that is recorded on the recording medium is the video signal output from the image sensing device; it does not have its signal level amplified by the amplifier circuit. Thus a video signal representing a subject image the brightness of which is faithful to the actual place of photography is recorded on the recording medium.

When the video signal is recorded on the recording medium, the amplification factor of the signal amplifier circuit returns to the initial amplification factor. As a result, the brightness of the subject image displayed on the display unit is the same as the brightness of the subject image represented by the video signal recorded on the recording medium. This makes it possible to verify the subject image represented by the video signal actually recorded.

Further, even if the construction of the portable image pick-up apparatus is such that the video signal amplified by the signal amplifier circuit is recorded on the recording medium, a video signal representing the image of a subject the brightness of which conforms to the actual place of photography will be recorded on the recording medium.

It is preferred that the portable image pick-up apparatus further include a photometer unit for metering luminance of a subject, and a subject-luminance discrimination unit for determining whether a luminance value of the subject metered by the photometer unit is less than a predetermined threshold value. In this case, the amplification-factor changeover unit changes over the amplification factor of the signal amplifier circuit from the initial amplification factor to the first display amplification factor in response to a determination by the subject-luminance discrimination unit that the luminance value of the subject is less than the predetermined value and, moreover, to setting of manual focus by the focusing setting unit.

Thus, when the luminance of the subject is less than the predetermined threshold value, the amplification factor of the signal amplifier circuit is changed over from the initial amplification factor to the first display amplification factor. When the image of the subject to be sensed is dark and becomes difficult to see when it is displayed on the display screen of the display unit, the image of the subject is brightened.

The portable image pick-up apparatus may further include a setting unit for setting the amount of brightness adjustment, and a brightness adjustment unit for performing a brightness adjustment in such a manner that the brightness of the image of the subject displayed on the display unit is made greater than initial brightness.

There are cases where the image of the subject displayed on the display screen of the display unit is still dark even when the level of the video signal is raised by the signal amplifier circuit. Since the amount of brightness adjustment can be set, it is possible to brighten the image of the subject displayed on the display screen of the display unit.

The amplification-factor changeover unit can be adapted so as to change over the amplification factor of the signal amplifier circuit from the initial amplification factor to a second display amplification factor larger than the initial amplification factor in response to setting of autofocus by the focusing setting unit.

The brightness adjustment unit is capable performing adjustment in such a manner that the brightness of the image of the subject displayed on the display unit becomes greater than the initial brightness in response to setting of manual focus by the focusing setting unit.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
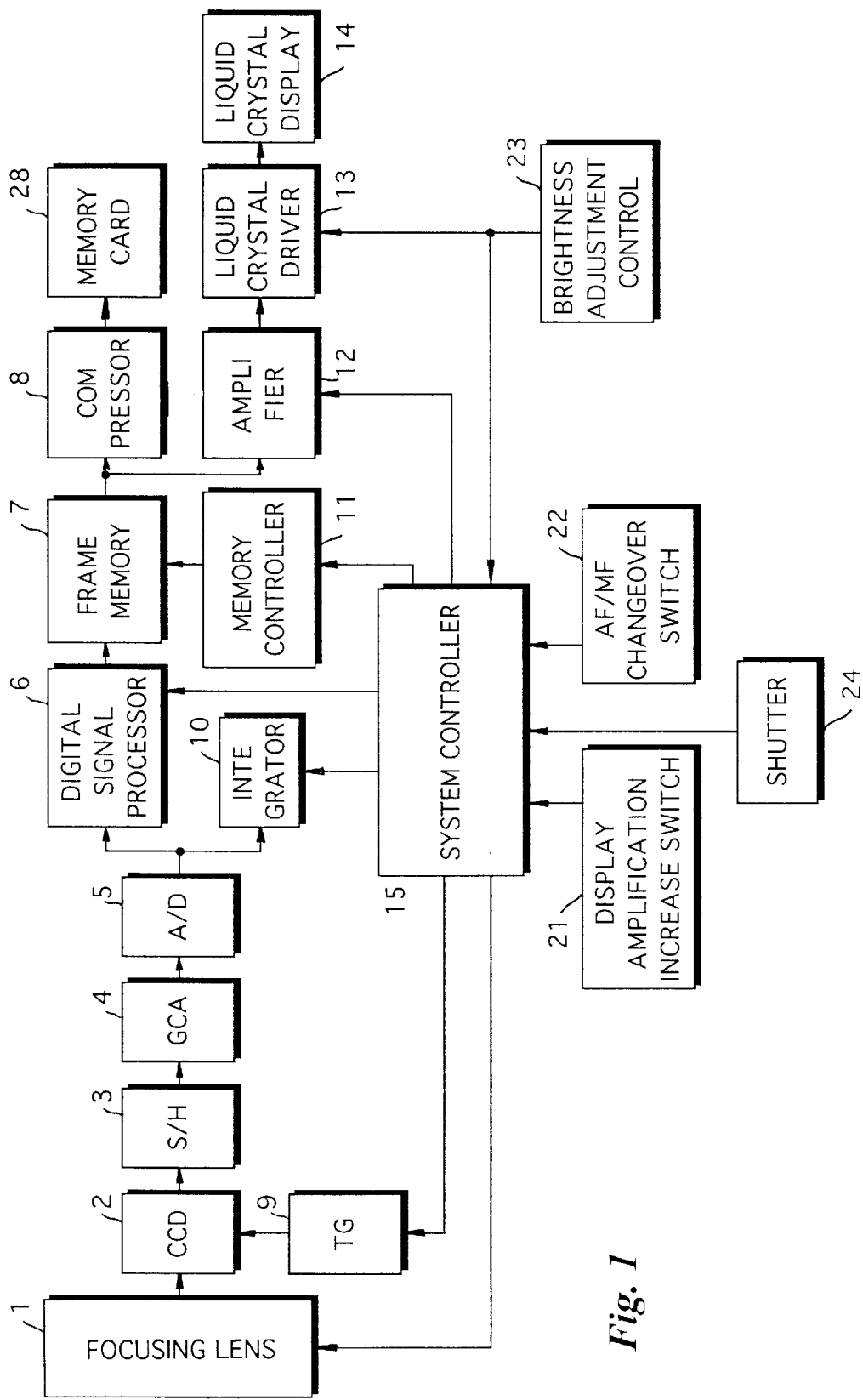
FIG. 1 is a block diagram illustrating the electrical construction of a digital still camera according to an embodiment of the present invention.

FIG. 1 is a block diagram illustrating the electrical construction of a digital still camera according to the embodiment of the present invention.

The overall operation of the digital still camera is controlled by a system controller 15.

The digital still camera is capable of both autofocus (AF) adjustment and manual focus (MF) adjustment. An AF/MF changeover switch 22 for setting the autofocus or manual focus adjustment is provided. A signal indicating the setting made by the AF/MF changeover switch 22 is applied to the system controller 15.

The digital still camera is provided with a liquid crystal display device 14 and with a brightness adjustment control 23 for brightening the image of a subject displayed on the liquid crystal display device 14. A signal representing the amount of adjustment made by the brightness adjustment control 23 is input to the system controller 15 and to a liquid crystal driver 13. The digital still camera includes also a display amplification increase switch 21. The latter is set when the image of the subject displayed on the liquid crystal display device 14 is to be brightened. The signal representing the setting of the display amplification increase switch 21 is input to the system controller 15.

The digital still camera is further provided with a two-stroke shutter-release button 24. A trigger-signal indicating depression of the shutter-release button 24 is input to the system controller 15.

When autofocus has been set, the image of the subject is formed on the light-receptor surface of a CCD 2 by a focusing lens (it goes without saying that manual focusing can be carried out) whose focusing is controlled by the system controller 15. The CCD 2 performs a predetermined operation such as an electronic shutter operation based upon a pulse applied to a timing generator (TG) 9 controlled by the system controller 15.

A video signal representing the image of the subject output from the CCD 2 is subjected to correlated double sampling processing in a sample-and-hold (S/H) circuit 3 and then is applied to a GCA (gain-controlled amplifier) 4. The video signal, the gain of which has been adjusted by the GCA 4, is converted to digital image data by an analog/digital conversion circuit 5. The digital image data output from the analog/digital conversion circuit 5 is input to a digital signal processing circuit 6 and to an integrating circuit 10.

The integrating circuit 10 integrates the entered digital image data and outputs data representing the luminance of the subject. This data is input to the system controller 15.

The digital image data is subjected to prescribed digital signal processing, such as a gamma correction, by the digital signal processing circuit 6. The digital image data that has been subjected to signal processing in the digital signal processing circuit 6 is applied, via a frame memory 7, to an amplifier circuit 12 the amplification factor of which can be changed over by the system controller 15. The digital image data has its level amplified by the amplifier circuit 12. The digital image data is applied to the liquid crystal display device 14 via the liquid crystal driver 13. The image of the subject sensed by the CCD 2 is displayed on the display screen of the liquid crystal display device 14.

When the shutter-release button 24 is pressed and the image data representing the image of the subject is recorded on a memory card 28, the digital image data output from the digital signal processing circuit 6 is stored temporarily in the frame memory 7. The frame memory 7 is controlled by a memory control circuit 11.

The digital image data that has been stored temporarily in the frame memory 7 is read out and applied to a compression circuit 8. The latter compresses the digital image data and records the compressed image data on the memory card 28.

Figure 2:
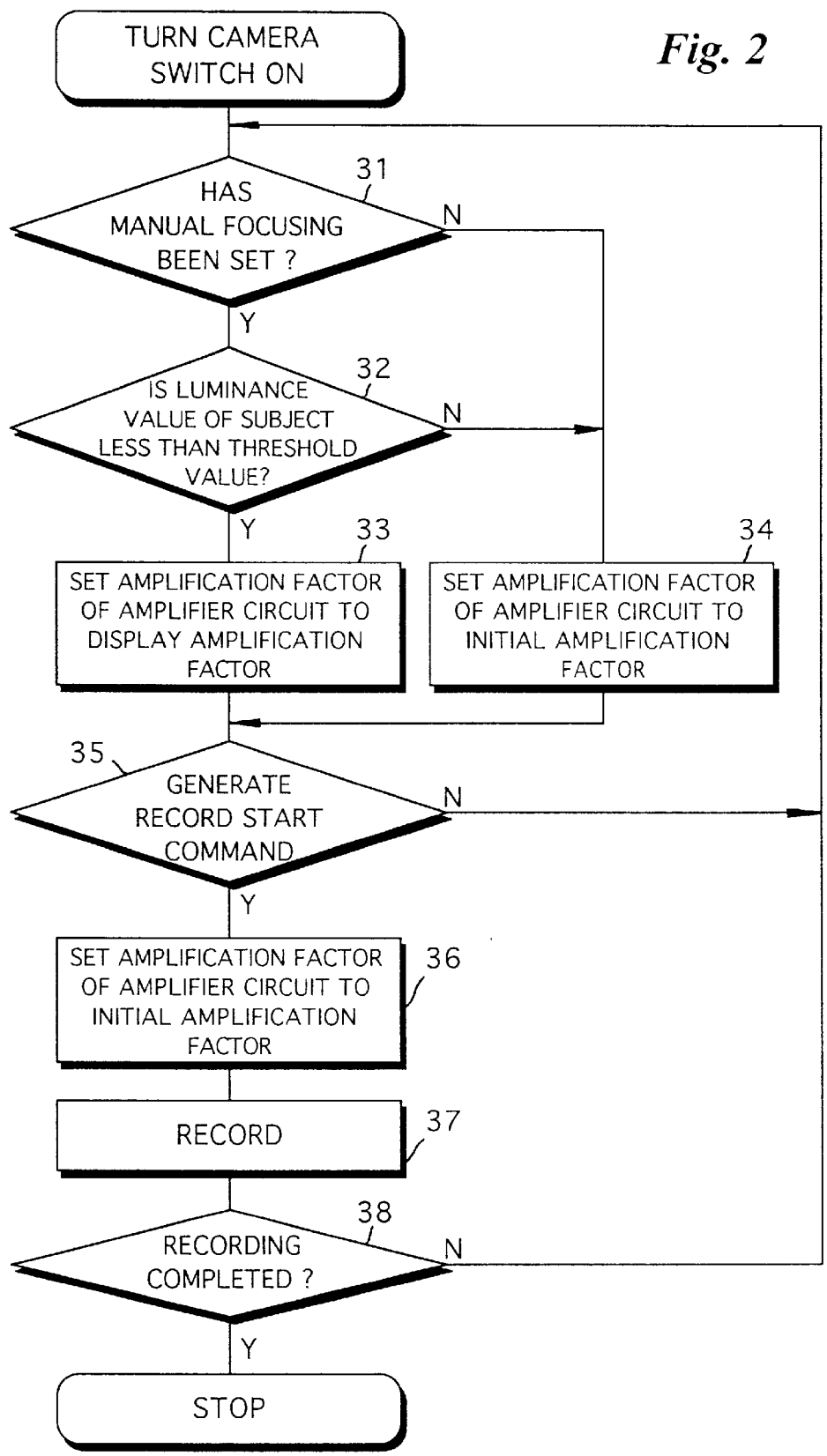
FIG. 2 is a flowchart illustrating processing executed by the digital still camera.

FIG. 2 is a flowchart illustrating processing executed by the digital still camera to record digital image data.

When the power supply of the digital still camera is turned on, the processing shown in FIG. 2 starts being executed.

First, it is determined whether the manual focus adjustment has been set by the AF/MF changeover switch 22 (step 31). If the manual focus adjustment has been set ("YES" at step 31), then the system controller 15 checks to see whether the luminance of the subject obtained from the integrating circuit 10 is less than a predetermined threshold value (step 32). If the luminance of the subject is less than the predetermined threshold value, then it may be presumed that photography is taking place at a dark location. In such case the image of the subject represented by the digital image data obtained by image pick-up will appear dark even when it is displayed on the display screen of the liquid crystal display device 14. This makes manual focusing difficult. Accordingly, if the manual focus adjustment has been set and the luminance of the subject is less than the predetermined threshold value, the amplification factor of the amplifier circuit 12 is set to a display amplification factor that is higher than the initial amplification factor (step 33).

Since the digital image data input to the amplifier circuit 12 is amplified at a high display amplification factor, a bright subject image is displayed on the display screen of the liquid crystal display device 14. Since a bright subject image is thus displayed despite the fact that the image of the subject is sensed at a dark location, the subject image is easy to see. This makes the manual focus adjustment comparatively easy.

When the autofocus adjustment has been set by the AF/MF changeover switch 22 ("NO" at step 31), this means that manual focusing will not be carried out. The amplification factor of the amplifier circuit 12, therefore, is set to the initial amplification factor. If the manual focus operation has been set but the luminance value of the subject is equal to or greater than the predetermined threshold value ("NO" at step 32), this means that the image of the subject being displayed on the display screen of the liquid crystal display device 14 is bright and easy to see. Since manual focusing can be performed with ease, therefore, the amplification factor of the amplifier circuit 12 is set to the initial amplification factor (step 34).

If the user presses the shutter-release button 24 through the first part of its stroke to generate the recording start command ("YES" at step 35), then the amplification factor of the amplifier circuit 12 is returned to the initial amplification factor (step 36). In response to pressing of the shutter-release button 24 through the second part of its stroke by the operator, the CCD 2 outputs a video signal representing the image of the subject and one frame of this image data is stored in the frame memory 7 in the manner set forth above. The digital image data that has been stored in the frame memory 7 is applied to the compression circuit 8, whereby the image data is compressed. The compressed digital image data is then stored on the memory card 28 (step 37). Thus, image data that is not affected by the changeover of the amplification factor of amplifier circuit 12 is recorded on the memory card 28. The result is that image data that faithfully represents the brightness of the image of the subject at the place of photography is recorded on the memory card 28.

When the recording of new image data takes place, the processing from step 31 onward is repeated (step 38).

According to the embodiment described above, the amplification factor is changed over in the amplifier circuit 12. However, an arrangement can be adopted in which the amplification factor is switched between the initial amplification factor and the display amplification factor in the GCA 4. In this case also the amplification factor of the GCA 4 would be returned to the initial amplification factor when the image data is recorded on the memory card 28. Image data representing a subject image faithful to the brightness at the actual place of location is thus stored on the memory card 28.

Figure 3A:
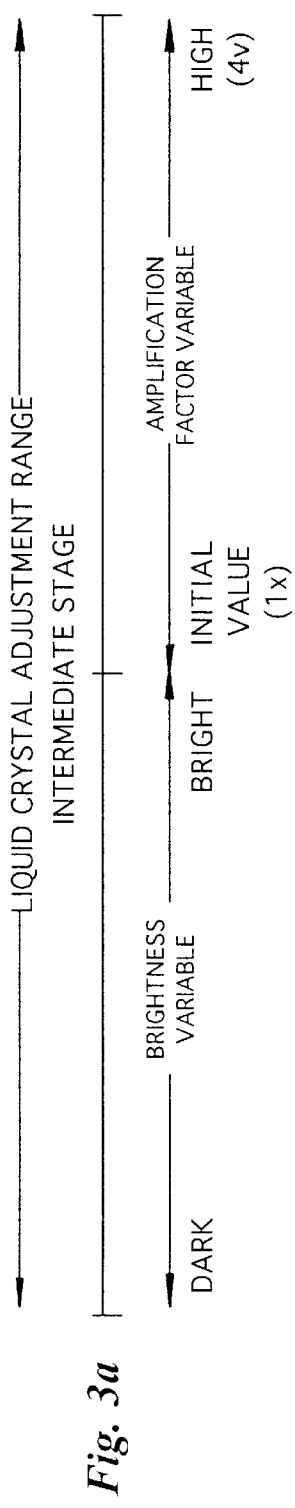
FIGS. 3a to 3c are diagrams illustrating adjustment of brightness of an image displayed on the display screen of a liquid crystal display device in accordance with the present invention.
Figure 3B:
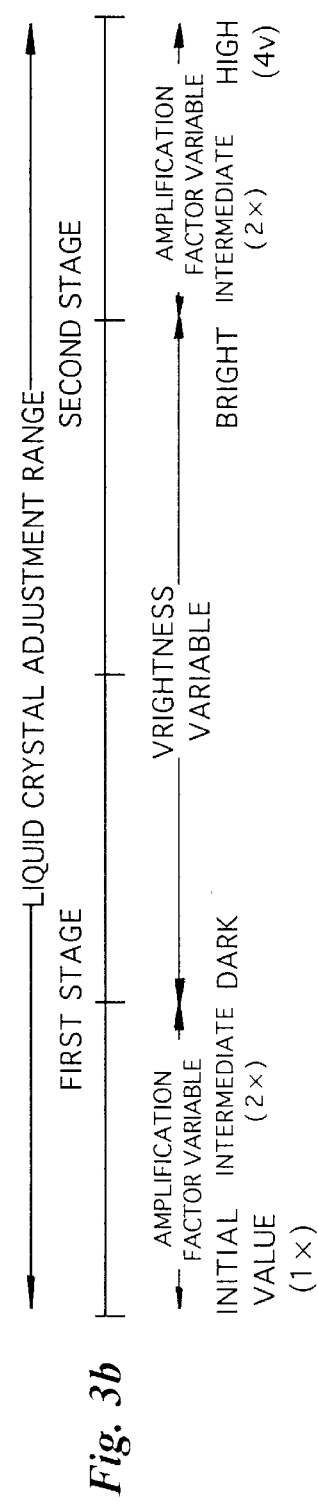
Figure 3C:
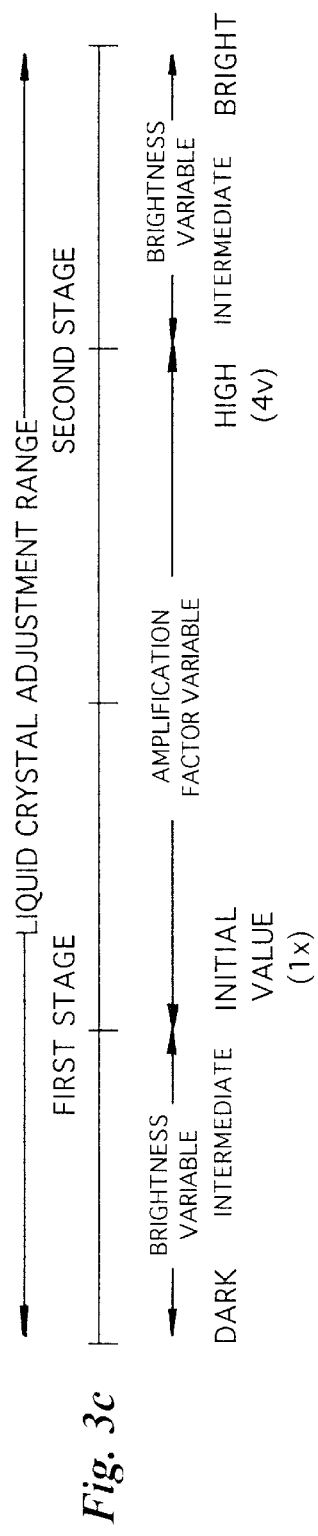

FIGS. 3a to 3c illustrate the range over which brightness of the liquid crystal display device is adjusted.

In accordance with the embodiment described above, the brightness of a subject image displayed on the display screen of the liquid crystal display device 14 is raised by changing the amplification factor of the amplifier circuit 12. Furthermore, the subject image displayed on the liquid crystal display device can be made easier to see by increasing the brightness per se of the display screen of liquid crystal display device 14.

In a case where the brightness of the display screen of liquid crystal display device 14 is to be increased, the display amplification increase switch 21 is turned on. When this is done, the amplification factor of the amplifier 12 is raised a fixed amount and the brightness of the display screen of liquid crystal display device 14 increases. Further, an arrangement may be adopted in which the amount of adjustment of the brightness adjustment control 23 is linked to a range which is the sum of the range over which brightness can be varied and the range over which the amplification factor can be varied.

For example, as shown in FIG. 3a, when adjustment is performed by the brightness adjustment control 23 up to an intermediate stage of the range over which the brightness of the liquid crystal cell is adjustable (the "liquid crystal adjustment range" in FIGS. 3a to 3c) and the image of the subject displayed on the display screen of the liquid crystal display device 14 is to be increased beyond this intermediate stage, the amplification factor of the amplifier circuit 12 is raised, in the manner described earlier, after maximum brightness is provided by the brightness adjustment control 23. This makes it easier to see the image of the subject.

When autofocus adjustment has been set, it is possible to adjust the brightness of the display screen of liquid crystal display device 14 by the brightness adjustment control 23. When manual focus adjustment has been set, it is possible to adjust the brightness of the display screen of liquid crystal display device 14 by changing over the amplification factor of the amplifier circuit 12 and by manipulating the brightness adjustment control 23.

Further, as shown in FIG. 3b, the brightness of the subject image displayed on the display screen of the liquid crystal display device 14 can be adjusted up to a first stage of the liquid crystal adjustment range by changing over the amplification factor; the brightness of the display screen per se of the liquid crystal display device 14 can be increased from the first stage to a second stage in accordance with adjustment by the brightness adjustment control 23; and the brightness of the image subject displayed on the display screen of the liquid crystal display device 14 can be adjusted from the second stage onward by changing over the amplification factor.

An arrangement may be adopted in which when the autofocus adjustment has been set, the amplification factor of the amplifier circuit 12 is made an intermediate amplification factor (an amplification factor of "2×" in FIG. 3b) and the brightness of the display screen per se of the liquid crystal display device 14 is adjusted by the brightness adjustment control 23.

Furthermore, as shown in FIG. 3c, the brightness of the display screen per se of the liquid crystal display device 14 may be adjusted up to the first stage of the liquid crystal adjustment range by the brightness adjustment control 23, and the brightness of the subject image displayed on the display screen of the liquid crystal display device 14 may be raised from the first stage to the second stage by changing over the amplification factor of the amplifier circuit 12.

It goes without saying that in the case of FIGS. 3a to 3c, the amplification factor of the amplifier circuit 12 can be set to three or more stages.

As many apparently widely different embodiments of the present invention can be made without departing from the spirit and scope thereof, it is to be understood that the invention is not limited to the specific embodiments thereof except as defined in the appended claims.

What is claimed is:

1. A portable image pick-up apparatus comprising:

an image sensing device for sensing the image of a subject and outputting a video signal representing the image of the subject;

a focusing setting unit for setting autofocus and manual focus selectively;

a signal amplifier circuit for amplifying the video signal output from said image sensing device;

an amplification-factor changeover unit, responsive to setting of manual focus by said focusing setting unit, for changing over an amplification factor of said signal amplifier circuit from a predetermined initial amplification factor to a first display amplification factor that is greater than the initial amplification factor;

a display unit for displaying the image of the subject represented by the video signal amplified by said signal amplifier circuit;

a trigger signal generating circuit for generating a trigger signal in response to a record command applied thereto; and a recording control unit, responsive to the trigger signal generated by said trigger signal generating circuit, for recording the video signal, which is output from said image sensing device, on a recording medium.

2. The apparatus according to claim 1, wherein said amplification-factor changeover unit returns the amplification factor in said signal amplifier circuit from the first display amplification factor to the initial amplification factor in response to the record command.

3. The apparatus according to claim 1, further comprising:

a photometer unit for metering luminance of a subject; and a subject-luminance discrimination unit for determining whether a luminance value of the subject metered by said photometer unit is less than a predetermined threshold value;

wherein said amplification-factor changeover unit changes over the amplification factor of said signal amplifier circuit from the initial amplification factor to the first display amplification factor in response to a determination by said subject-luminance discrimination unit that the luminance value of the subject is less than the predetermined threshold value and, moreover, to setting of manual focus by said focusing setting unit.

4. The apparatus according to claim 1, further comprising:

a setting unit for setting amount of brightness adjustment; and a brightness adjustment unit for performing a brightness adjustment in such a manner that the brightness of the image of the subject displayed on said display unit is made greater than initial brightness.

5. The apparatus according to claim 4, wherein said amplification-factor changeover unit changes over the amplification factor of said signal amplifier circuit from the initial amplification factor to a second display amplification factor larger than the initial amplification factor in response to setting of autofocus by said focusing setting unit.

6. The apparatus according to claim 4, wherein said brightness adjustment unit performs adjustment in such a manner that the brightness of the image of the subject displayed on said display unit becomes greater than the initial brightness in response to setting of manual focus by said focusing setting unit.

7. A method of controlling operation of a portable image pick-up apparatus having an image sensing device for sensing the image of a subject and outputting a video signal representing the image of the subject, and a signal amplifier circuit for amplifying the video signal output from the image sensing device, said method comprising the steps of:

providing a focusing setting unit for setting autofocus and manual focus selectively;

changing over an amplification factor of the signal amplifier circuit from a predetermined initial amplification factor to a first display amplification factor that is greater than the initial amplification factor in response to setting of manual focus by the focusing setting unit;

displaying the image of the subject represented by the video signal amplified by the signal amplifier circuit; and recording the video signal, which is output from the image sensing device, on a recording medium in response to a trigger signal generated by application of a record command.

* * * * *